US006934474B2

(12) United States Patent
Song et al.

(10) Patent No.: US 6,934,474 B2
(45) Date of Patent: Aug. 23, 2005

(54) BIDIRECTIONAL ADD/DROP MULTIPLEXER

(75) Inventors: Kwan-Woong Song, Seoul (KR); Tae-Sung Park, Suwon-shi (KR); Shin-Hee Won, Seoul (KR); Yun-Je Oh, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 09/946,206

(22) Filed: Sep. 5, 2001

(65) Prior Publication Data

US 2002/0027685 A1 Mar. 7, 2002

(30) Foreign Application Priority Data

Sep. 6, 2000 (KR) .............................. 2000-52685

(51) Int. Cl.[7] .......................... H04J 14/02; G02B 6/28
(52) U.S. Cl. .......................... 398/84; 398/87; 385/24
(58) Field of Search .......................... 398/84, 83, 87; 385/24

(56) References Cited

U.S. PATENT DOCUMENTS 6,188,509 B1 * 2/2001 Lee et al. ............... 359/341.2
6,512,613 B1 * 1/2003 Tanaka et al. ............... 398/97

FOREIGN PATENT DOCUMENTS

| JP | 10-173598 | 6/1998 | ........... H04B/10/02 |
| JP | 11-127121 | 5/1999 | ........... H04B/10/24 |

OTHER PUBLICATIONS

Y. Zhao et al, "A Novel Bidirectional Add/Drop Module Using Waveguide Grating Routers and Wavelength Channel Matched Fiber Gratings", IEEE Photonics Technology Letters, vol. 11, No. 9, Sep. 1999.*

* cited by examiner

Primary Examiner—M. R. Sedighian
Assistant Examiner—Shi K. Li
(74) Attorney, Agent, or Firm—Cha & Reiter, L.L.C.

(57) ABSTRACT

The present invention is directed to a bidirectional add/drop multiplexer connected with waveguides at opposite ends thereof, respectively, and adapted to add/drop a channel in forward and reverse directions. The multiplexer includes a forward arrayed waveguide grating for demultiplexing the respective channels of the forward optical signal inputted thereto, for adding or dropping a channel to the demultiplexed channels of the forward optical signal, and for multiplexing the channel-added or dropped channels; a reverse arrayed waveguide grating for demultiplexing respective channels of the reverse optical signal inputted thereto, for adding or dropping a channel to the demultiplexed channels of the reverse optical signal, and for multiplexing the channel-added or dropped channels; a first circulator for inputting the forward optical signal to the forward waveguide grating and outputting the reverse optical signal received from the reverse waveguide grating to one of the waveguides, and, a second circulator for inputting the reverse optical signal to the forward waveguide grating and outputting the forward optical signal received from the forward waveguide grating to the other waveguide. Using this arrangement, the bidirectional add/drop multiplexer is capable of cutting off the relative intensity noise while avoiding the collision of the forward and reverse optical signals.

18 Claims, 3 Drawing Sheets

BIDIRECTIONAL ADD/DROP MULTIPLEXER

CLAIM OF PRIORITY

This application makes reference to, incorporates the same herein, and claims all benefits accruing under 35 U.S.C. Section 119 from an application for "BIDIRECTIONAL ADD/DROP MULTIPLEXER," filed earlier in the Korean Industrial Property Office on Sep. 6, 2000, and there duly assigned Serial No. 2000-52685.

BACKGROUND OF THE INVENTION

1. Field of the Invention

The present invention relates to a wavelength division multiplexing device and, more particularly, to an add/drop multiplexer for adding or dropping channels to/from an optical signal.

2. Description of the Related Art

Wavelength division multiplexing is a technique used to simultaneously transmit a plurality of channels with different wavelengths on a single waveguide, whereas wavelength division demultiplexing is a technique used to separate a group of multiplexed channels into an independent channel. The demand for using a wavelength division multiplexing system in optical communication networks is growing to accommodate the increase in communication capacity. For this type of optical communication network, add/drop multiplexers are typically used to achieve the function of adding new channels or dropping unused channels. For concurrent transmission of optical signals in forward and reverse directions, a bidirectional add/drop multiplexer has been used as it provides a combined function of two unidirectional add/drop multiplexers. However, such a bidirectional add/drop multiplexer has a high probability of generating undesirable relative intensity noise due to its configuration in which a signal wavelength division multiplexer/demultiplexer is typically used.

FIG. 1 is a diagram illustrating the generation of relative intensity noise at one of the connectors in a conventional bidirectional add/drop multiplexer. As shown in FIG. 1, the bidirectional add/drop multiplexer includes first and second connectors 12 and 19 for providing a connection between an external waveguide 11 and an internal waveguide 13, first and second circulators 16 and 18 for branching an input optical signal 14 to desired terminals, respectively, and a 16×16 arrayed waveguide grating 17. The input optical signal 14 is the optical signal of a single channel.

The first circulator 16 serves to input the optical signal 14 of a single channel, which travels in a forward direction, to the 11-th terminal of the arrayed waveguide grating 17. The 11-th terminal of the arrayed waveguide grating 17 is a forward demultiplexing terminal and serves the optical signal 14 to the 10'-th terminal. This 10'-th terminal is connected to the 16'-th terminal. The optical signal 14 outputted from the 16'-th terminal is applied to the 5-th terminal, which is a forward multiplexing terminal. The optical signal 14 from the 5-th terminal is applied to the second circulator 18, which in turn transmits the optical signal 14 to the second connector 19 connected to the external waveguide 11.

In the above arrangement, the relative intensity noise may be generated easily due to the following three main causes.

The first cause is the Rayleigh back-scattering phenomenon of an optical signal with a plurality of channels that occurs as the optical signal travels along a single waveguide. Typically, the Rayleigh back-scattering phenomenon occurs due to structural defects in the waveguide.

The second cause is a reflection phenomenon that occurs in a connector. Typically, this reflection phenomenon occurs due to the non-uniformity of the boundary between the internal and external waveguides of a bidirectional add/drop multiplexer.

The third cause is a cross-talk phenomenon of optical signals that occurs in an arrayed waveguide grating. That is, although the channels of an optical signal should be inputted to designated terminals during demultiplexing and multiplexing operations, respectively, they may be unintentionally inputted to adjacent terminals that are located around the designated terminals.

Furthermore, where the relative intensity noise exists on the same path as that of the channel with the same wavelength, the interference may occur in that channel.

With continued reference to FIG. 1, the relative intensity noise 15 generated at the first connector 12 travels the same path as that of the optical signal 14 inputted to the first connector 12, and enters the 5'-th terminal via the 11-th terminal. The relative intensity noise 15 from the 5'-th terminal is inputted to the first circulator 16, which in turn outputs the relative intensity noise 15 back to the first connector 12. Thus, the relative intensity noise 15 is circulated repeatedly.

FIG. 2 is a diagram illustrating the generation of relative intensity noise at the second connector in the conventional bidirectional add/drop multiplexer. As shown in FIG. 2, the relative intensity noise 25 generated at the second connector 29 is inputted to the 11'-th terminal, which is a reverse demultiplexing terminal, after passing through the second circulator 28. The relative intensity noise 25 from the 11'-th terminal is inputted to the 5-th terminal, which is a reverse multiplexing terminal. Thereafter, the relative intensity noise 25 from the 5-th terminal is inputted to the second circulator 28, which in turn outputs the relative intensity noise 25 to the second connector 29. Thus, the relative intensity noise 25 is circulated repeatedly.

The relative intensity noise described with reference to both FIGS. 1 and 2 may be generated at the first and second connectors and may thus travel simultaneously. In addition, the forward and reverse optical signals may collide with each other at a particular terminal. In such a case, the wavelength corresponding to the terminal associated with the signal collision cannot be transmitted. As a result, the number of channels available in the add/drop multiplexer is reduced. In order to avoid this type of channel reduction, it is necessary to install an additional circulator at the terminal associated with the signal collision or to replace the circulator associated with the signal collision a 4-terminal circulator.

As mentioned above, the conventional bidirectional add/drop multiplexer has drawbacks in that the relative intensity noise may be generated and the forward and reverse optical signals may collide with each other at a particular terminal.

SUMMARY OF THE INVENTION

The present invention is directed to provide a bidirectional add/drop multiplexer that is capable of cutting off the relative intensity noise generated therein while avoiding the collision of forward and reverse optical signals.

The present invention provides a bidirectional add/drop multiplexer connected to waveguides at opposite stages thereof, respectively, and adapted to add/drop a channel to/from optical signals traveling in forward and reverse directions, respectively. The inventive multiplexer includes:

a forward arrayed waveguide grating for demultiplexing the respective channels of the forward optical signal inputted thereto, for adding or dropping a channel to the demultiplexed channels of the forward optical signal, and for multiplexing the channel-added or dropped channels;

a reverse arrayed waveguide grating for demultiplexing respective channels of the reverse optical signal inputted thereto, for adding or dropping a channel to the demultiplexed channels of the reverse optical signal, and for multiplexing the channel-added or dropped channels;

a first circulator for inputting the forward optical signal to the forward waveguide grating and outputting, the reverse optical signal received from the reverse waveguide grating to one of the waveguides; and, a second circulator for inputting the reverse optical signal to the forward waveguide grating and outputting the forward optical signal received from the forward waveguide grating to the other waveguide.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE PREFERRED EMBODIMENT

In the following description, for purposes of explanation rather than limitation specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
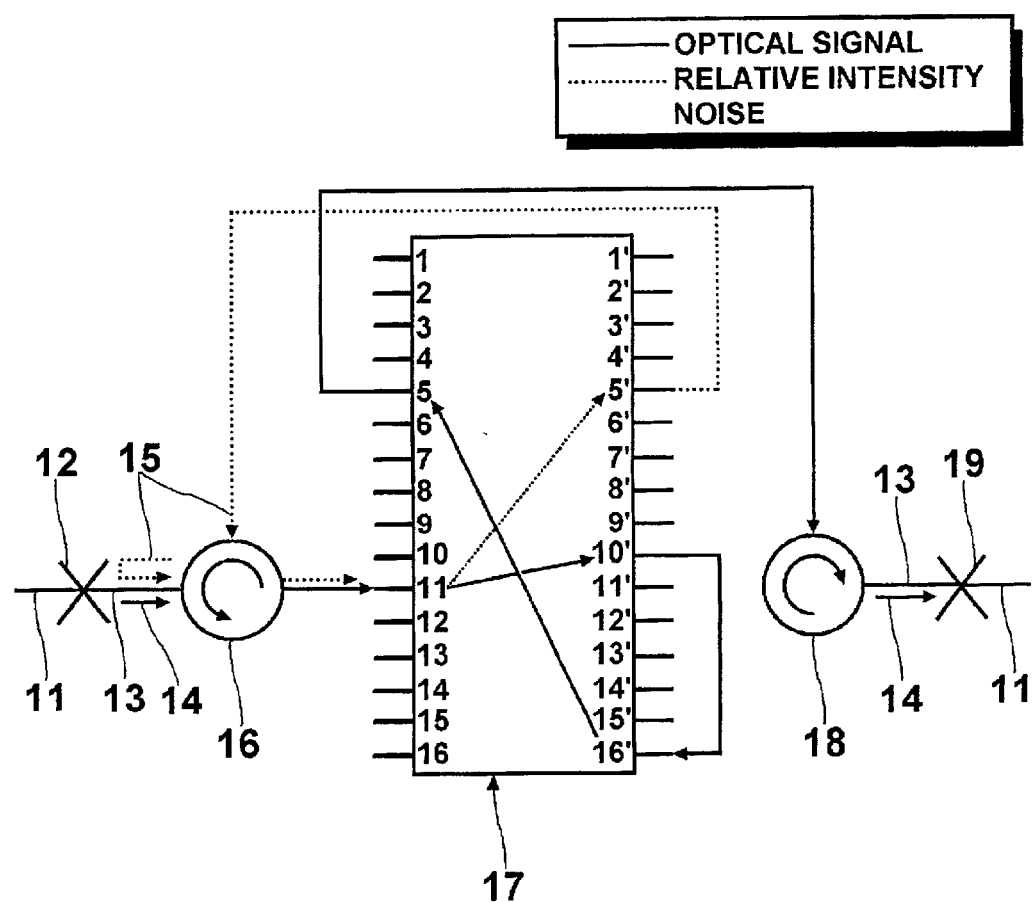
FIGS. 1 and 2 are diagrams illustrating a conventional bidirectional add/drop multiplexer, respectively; and, FIG. 3 is a diagram illustrating a bidirectional add/drop multiplexer according to a preferred embodiment of the present invention.
Figure 2:
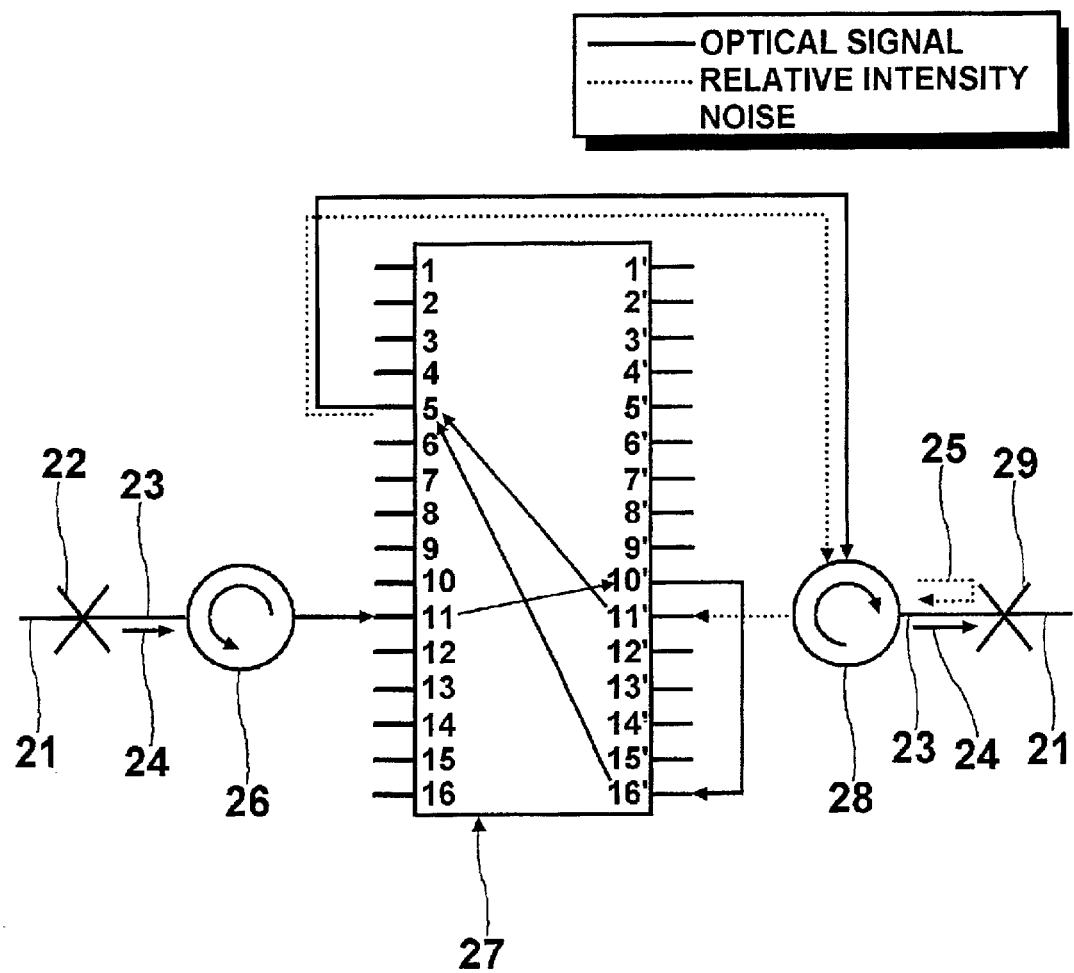
Figure 3:
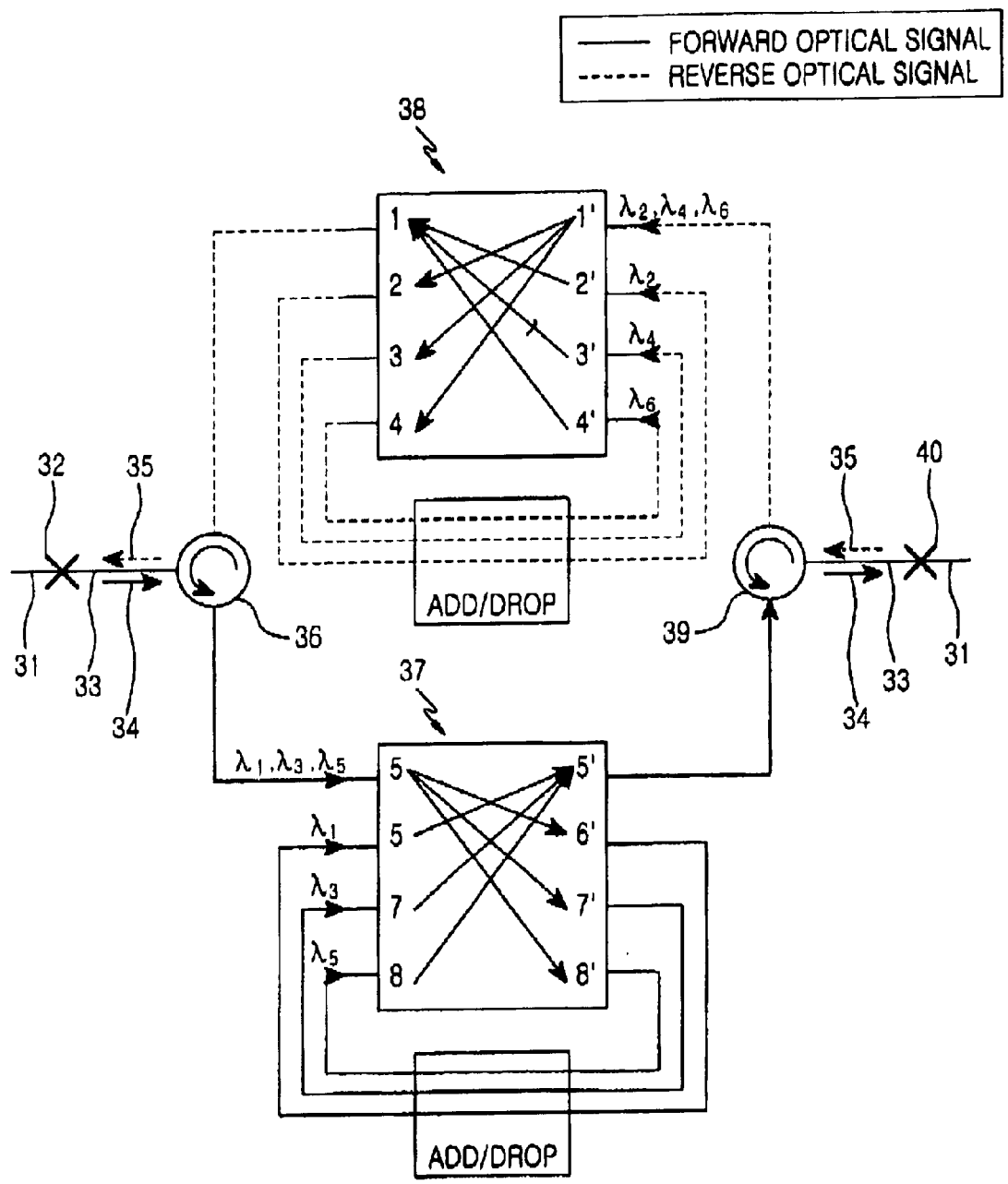

FIG. 3 is a diagram illustrating a bidirectional add/drop multiplexer according to a preferred embodiment of the present invention. As shown in FIG. 3, the bidirectional add/drop multiplexer includes a first connector 32, a first circulator 36, a forward arrayed waveguide grating 37, a reverse arrayed waveguide grating 38, a second circulator 39, and a second connector 40.

First, a discussion of a forward optical signal 34 will be described hereinafter. The first connector 32 serves to connect external and internal waveguides 31 and 33 with each other. The forward optical signal 34 of three channels $\lambda_1$, $\lambda_3$, and $\lambda_5$ inputted to the first connector 32 is applied to a demultiplexing terminal of the forward arrayed waveguide grating 37, the 5-th terminal. The channels $\lambda_1$, $\lambda_3$, and $\lambda_5$, which are outputted from the 5-th terminal after being demultiplexed, are applied to the 6'-th, 7'-th, and 8'-th terminals, respectively. As the 6'-th, 7'-th, and 8'-th terminals are coupled to the 6-th, 7-th, and 8-th terminals, the channels $\lambda_1$, $\lambda_3$, and $\lambda_5$ are inputted to the respective 6-th, 7-th, and 8-th terminals, then applied to the 5'-th terminal, which is a multiplexing terminal. The 5'-th terminal outputs the channels $\lambda_1$, $\lambda_3$, and $\lambda_5$ to the second circulator 39 after multiplexing those channels $\lambda_1$, $\lambda_3$, and $\lambda_5$. Finally, the second circulator 39 outputs the forward optical signal 34 to the second connector 40.

Next, a discussion of a reverse optical signal 35 will be described hereinafter. The reverse optical signal 35 of three channels $\lambda_2$, $\lambda_4$, and $\lambda_6$ inputted to the second connector 40 is applied to a demultiplexing terminal of the reverse arrayed waveguide grating 38, the 1'-st terminal. The channels $\lambda_2$, $\lambda_4$, and $\lambda_6$, which are outputted from the 1'-st terminal after being demultiplexed, are applied to the 2-nd, 3-rd, and 4-th terminals, respectively. As the 2-nd, 3-rd, and 4-th terminals are coupled to the 2'-nd, 3'-rd, and 4'-th terminals, the channels $\lambda_2$, $\lambda_4$, and $\lambda_6$ are inputted to the respective 2'-nd, 3'-rd, and 4'-th terminals, then applied to the 1-st terminal, which is a multiplexing terminal. The 1'-st terminal outputs the channels $\lambda_2$, $\lambda_4$, and $\lambda_6$ to the first circulator 36 after multiplexing those channels $\lambda_2$, $\lambda_4$, and $\lambda_6$. Thereafter the first circulator 36 outputs the reverse optical signal 35 to the first connector 32.

Preferably, the channel wavelengths $\lambda_1$, $\lambda_3$, and $\lambda_5$ of the forward optical signal 34 are different from the channel wavelengths $\lambda_2$, $\lambda_4$, and $\lambda_6$ of the reverse optical signal 35. In this case, even when the relative intensity noise with the same channel wavelength as the channel wavelength of an optical signal may be generated at a connector, it is possible to cut off the traveling of the relative intensity noise along the arrayed waveguide grating because the arrayed waveguide grating has no terminal corresponding to the wavelength of the relative intensity noise. For example, the relative intensity noise with the same channel wavelength as the channel wavelength $\lambda_1$, $\lambda_3$, or $\lambda_5$ of the forward optical signal 34 may be generated at the second connector 40. This relative intensity noise (not shown) is then inputted to the second circulator 39, which in turn applies the relative intensity noise to the 1'-st terminal of the reverse arrayed waveguide grating 38. However, any further traveling of the relative intensity noise along the reverse arrayed waveguide grating 38 is cut off because the reverse arrayed waveguide grating 38 has no terminal corresponding to the wavelength of the relative intensity noise.

Moreover, where the relative intensity noise with the same channel wavelength as the channel wavelength $\lambda_2$, $\lambda_4$, or $\lambda_6$ of the reverse optical signal 35 is generated at the first connector 32, the relative intensity noise is inputted to the first circulator 36, which in turn applies the relative intensity noise to the 5-th terminal of the forward arrayed waveguide grating 37. However, any further traveling of the relative intensity noise along the reverse arrayed waveguide grating 38 is cut off because the reverse arrayed waveguide grating 38 has no terminal corresponding to the wavelength of the relative intensity noise.

Furthermore, there is no collision between the forward and reverse optical signals 34 and 35 because the travel paths of those forward and reverse optical signals 34 and 35 are different from each other.

Now, adding and dropping channels will be briefly described for a better understanding of the present invention.

Channel adding will be described in conjunction with the case in which it is desired to add a channel $\lambda_5$ to a forward optical signal of two channels $\lambda_1$ and $\lambda_3$ in the bidirectional add/drop multiplexer shown in FIG. 3. In this case, the forward optical signal is inputted to the 5-th terminal of the forward arrayed waveguide grating 37, and then demultiplexed. The demultiplexed channels $\lambda_1$ and $\lambda_3$ are inputted to the 6'-th and 7'-th terminals respectively. At this time, the additional channel $\lambda_5$ is inputted to the 8-th terminal coupled to the 5'-th terminal. As a result, all the channels $\lambda_1$, $\lambda_3$, and $\lambda_5$ are inputted to the 5'-th terminal, so that they are multiplexed. The multiplexed channels $\lambda_1$, $\lambda_3$, and $\lambda_5$ are finally inputted to the second connector 40 via the second circulator 39.

Channel dropping will be described in conjunction with the case in which it is desired to drop a channel $\lambda_5$ from a forward optical signal of three channels $\lambda_1$, $\lambda_3$, and $\lambda_5$ in the bidirectional add/drop multiplexer shown in FIG. 3. In this case, the forward optical signal is inputted to the 5-th terminal of the forward arrayed waveguide grating 37, and then demultiplexed. The demultiplexed channels $\lambda_1$, $\lambda_3$, and $\lambda_5$ are inputted to the 6'-th, 7'-th, and 8'-th terminals respectively. At this time, the channel $\lambda_5$ inputted to the 8'-th terminal is dropped. As a result, only the channels $\lambda_1$ and $\lambda_3$ are inputted to the 5'-th terminal, and then multiplexed. The multiplexed channels $\lambda_1$ and $\lambda_3$ are finally inputted to the second connector 40 via the second circulator 39.

As apparent from the above description, the bidirectional add/drop multiplexer of the present invention provides advantages in that it has an arrangement, in which paths of forward and reverse optical signals are different from each other, thereby being capable of cutting off the traveling of the relative intensity noise while avoiding collision of the forward and reverse optical signals.

While this invention has been described in connection with what is presently considered the most practical and preferred embodiment, it is to be understood that the invention is not limited to the disclosed embodiment; to the contrary, it is intended to cover various modifications within the spirit and the scope of the appended claims.

What is claimed is:

1. A bidirectional add/drop multiplexer for transmitting a wavelength division multiplexed signal and adding/dropping a signal in both forward and reverse directions, comprising;
   a first circulator having an input for receiving a forward optical signal and an output;
   a second circulator having an input for receiving a reverse optical signal and an output;
   a forward waveguide grating having first and second ends, said forward optical signal traversing the forward waveguide grating once to travel from the first end to the second end, said forward waveguide grating being coupled to said first circulator at said first end, and being coupled at said second end to said second circulator to transmit said forward optical signal to said second circulator, said forward waveguide grating for demultiplexing said forward optical signal received from said first circulator, for at least one of adding a channel to and dropping a channel from the demultiplexed channels of said forward optical signal, and for multiplexing both the forward channels added and the forward channels not dropped; and
   a reverse waveguide grating having two ends, said reverse waveguide grating being coupled to said first circulator at one of said two ends and to said second circulator at the other of said two ends, said reverse waveguide grating for demultiplexing said reverse optical signal received from said second circulator, for at least one of adding a channel to and dropping a channel from the demultiplexed channels of said reverse optical signal, and for multiplexing both the reverse channels added and the reverse channels not dropped.

2. The bidirectional add/drop multiplexer according to claim 1, wherein each of the forward and reverse waveguide gratings comprises:
   a demultiplexing terminal for demultiplexing an optical signal received therein;
   a plurality of input terminals for receiving the respective channel of said demultiplexed optical signal;
   a plurality of output terminals equals the number of input terminals for adaptively output signals received from the corresponding input terminal; and,
   a multiplexing terminal for multiplexing the channels outputted from the output terminals and for outputting the multiplexed channels.

3. The bidirectional add/drop multiplexer according to claim 1, further comprising:
   a pair of connectors for connecting both ends of the bidirectional add/drop multiplexer to waveguides, respectively.

4. The bidirectional add/drop multiplexer according to claim 1, wherein the forward and reverse optical signals have different wavelengths, respectively.

5. The bidirectional add/drop multiplexer according to claim 1, wherein said forward waveguide grating comprises an arrayed-waveguide grating having a demultiplexing terminal, a multiplexing terminal, at least two input terminals, and at least two output terminals, wherein the number of said output terminals equals the number of said input terminals.

6. The bidirectional add/drop multiplexer according to claim 1, wherein said reverse waveguide grating comprises an arrayed-waveguide grating having a demultiplexing terminal, a multiplexing terminal, at least two input terminals, and at least two output terminals, wherein the number of said output terminals equals the number of said input terminals.

7. A bidirectional add/drop multiplexer for transmitting a wavelength division multiplexed signal and adding/dropping a signal in both forward and reverse directions, comprising;
   a first circulator having an input for receiving a forward optical signal and an output;
   a second circulator having an input for receiving a reverse optical signal and an output;
   a forward waveguide grating having first and second ends, said forward waveguide grating being coupled to said first circulator at said first end and to said second circulator at said second end, said forward waveguide grating for demultiplexing said forward optical signal received from said first circulator, for at least one of adding a channel to and dropping a channel from the demultiplexed channels of said forward optical signal, and for multiplexing both the forward channels added and the forward channels not dropped; and
   a reverse waveguide grating having two ends, said reverse waveguide grating being coupled to said first circulator at one of said two ends and to said second circulator at the other of said two ends, said reverse waveguide grating for demultiplexing said reverse optical signal received from said second circulator, for at least one of adding a channel to and dropping a channel from the demultiplexed channels of said reverse optical signal, and for multiplexing both the reverse channels added and the reverse channels not dropped, the two signals following respective paths in the respective grating, the gratings being configured so that the paths of one of the two signals traverse a region separate from a region traversed by the paths of the other of the two signals.

8. The bidirectional add/drop multiplexer according to claim 7, wherein each of the forward and reverse waveguide gratings comprises:

a demultiplexing terminal for demultiplexing an optical signal received therein;

a plurality of input terminals for receiving the respective channel of said demultiplexed optical signal;

a plurality of output terminals equals the number of input terminals for adaptively output signals received from the corresponding input terminal; and a multiplexing terminal for multiplexing the channels outputted from the output terminals and for outputting the multiplexed channels.

9. The bidirectional add/drop multiplexer according to claim 7, further comprising:

a pair of connectors for connecting both ends of the bidirectional add/drop multiplexer to waveguides, respectively.

10. The bidirectional add/drop multiplexer according to claim 7, wherein the forward and reverse optical signals have different wavelengths, respectively.

11. The bidirectional add/drop multiplexer according to claim 7, wherein said forward waveguide grating comprises an arrayed-waveguide grating having a demultiplexing terminal, a multiplexing terminal, at least two input terminals, and at least two output terminals, wherein the number of said output terminals equals the number of said input terminals.

12. The bidirectional add/drop multiplexer according to claim 7, wherein said reverse waveguide grating comprises an arrayed-waveguide grating having a demultiplexing terminal, a multiplexing terminal, at least two input terminals, and at least two output terminals, wherein the number of said output terminals equals the number of said input terminals.

13. A bidirectional add/drop multiplexer for transmitting a wavelength division multiplexed signal and adding/dropping a signal in both forward and reverse directions, comprising;

a first circulator having an input for receiving a forward optical signal and an output;

a second circulator having an input for receiving a reverse optical signal and an output;

a forward waveguide grating having first and second ends, said forward waveguide grating being coupled to said first circulator at said first end and to said second circulator at said second end, said forward waveguide grating for demultiplexing said forward optical signal received from said first circulator, for at least one of adding a channel to and dropping a channel from the demultiplexed channels of said forward optical signal, and for multiplexing both the forward channels added and the forward channels not dropped; and a reverse waveguide grating having two ends, said reverse waveguide grating being coupled to said first circulator at one of said two ends and to said second circulator at the other of said two ends, said reverse waveguide grating for demultiplexing said reverse optical signal received from said second circulator, for at least one of adding a channel to and dropping a channel from the demultiplexed channels of said reverse optical signal, and for multiplexing both the reverse channels added and the reverse channels not dropped, said gratings having respective terminals for the forward and reverse optical signals, said terminals of one of the gratings being disposed so as to not interleave with any of said terminals of the other grating.

14. The bidirectional add/drop multiplexer according to claim 13, wherein each of the forward and reverse waveguide gratings comprises:

a demultiplexing terminal for demultiplexing an optical signal received therein;

a plurality of input terminals for receiving the respective channel of said demultiplexed optical signal;

a plurality of output terminals equals the number of input terminals for adaptively output signals received from the corresponding input terminal; and, a multiplexing terminal for multiplexing the channels outputted from the output terminals and for outputting the multiplexed channels.

15. The bidirectional add/drop multiplexer according to claim 13, further comprising:

a pair of connectors for connecting both ends of the bidirectional add/drop multiplexer to waveguides, respectively.

16. The bidirectional add/drop multiplexer according to claim 13, wherein the forward and reverse optical signals have different wavelengths, respectively.

17. The bidirectional add/drop multiplexer according to claim 13, wherein said forward waveguide grating comprises an arrayed-waveguide grating having a demultiplexing terminal, a multiplexing terminal, at least two input terminals, and at least two output terminals, wherein the number of said output terminals equals the number of said input terminals.

18. The bidirectional add/drop multiplexer according to claim 13, wherein said reverse waveguide grating comprises an arrayed-waveguide grating having a demultiplexing terminal, a multiplexing terminal, at least two input terminals, and at least two output terminals, wherein the number of said output terminals equals the number of said input terminals.

* * * * *